United States Patent Office 2,779,188
Patented Jan. 29, 1957

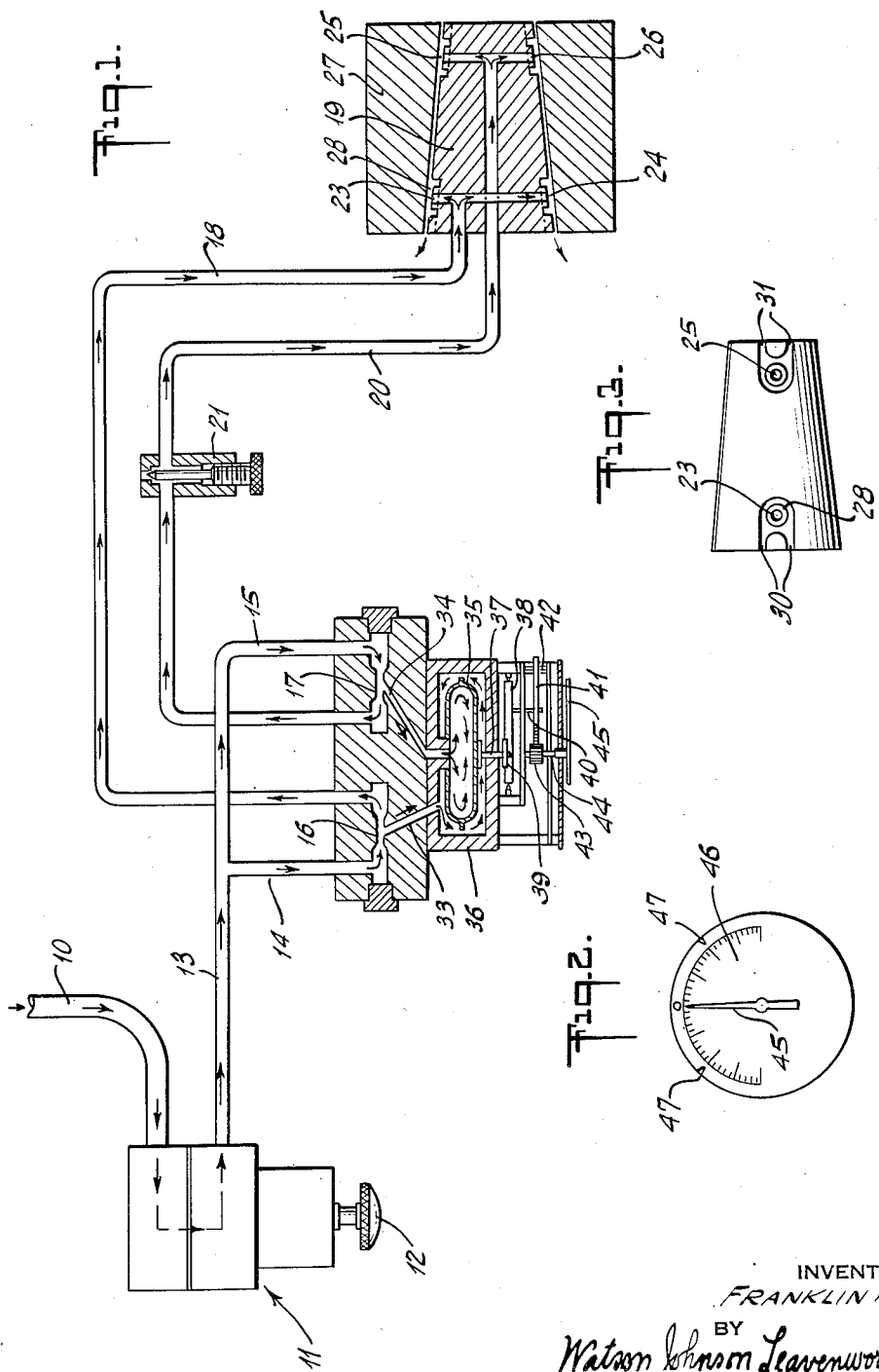

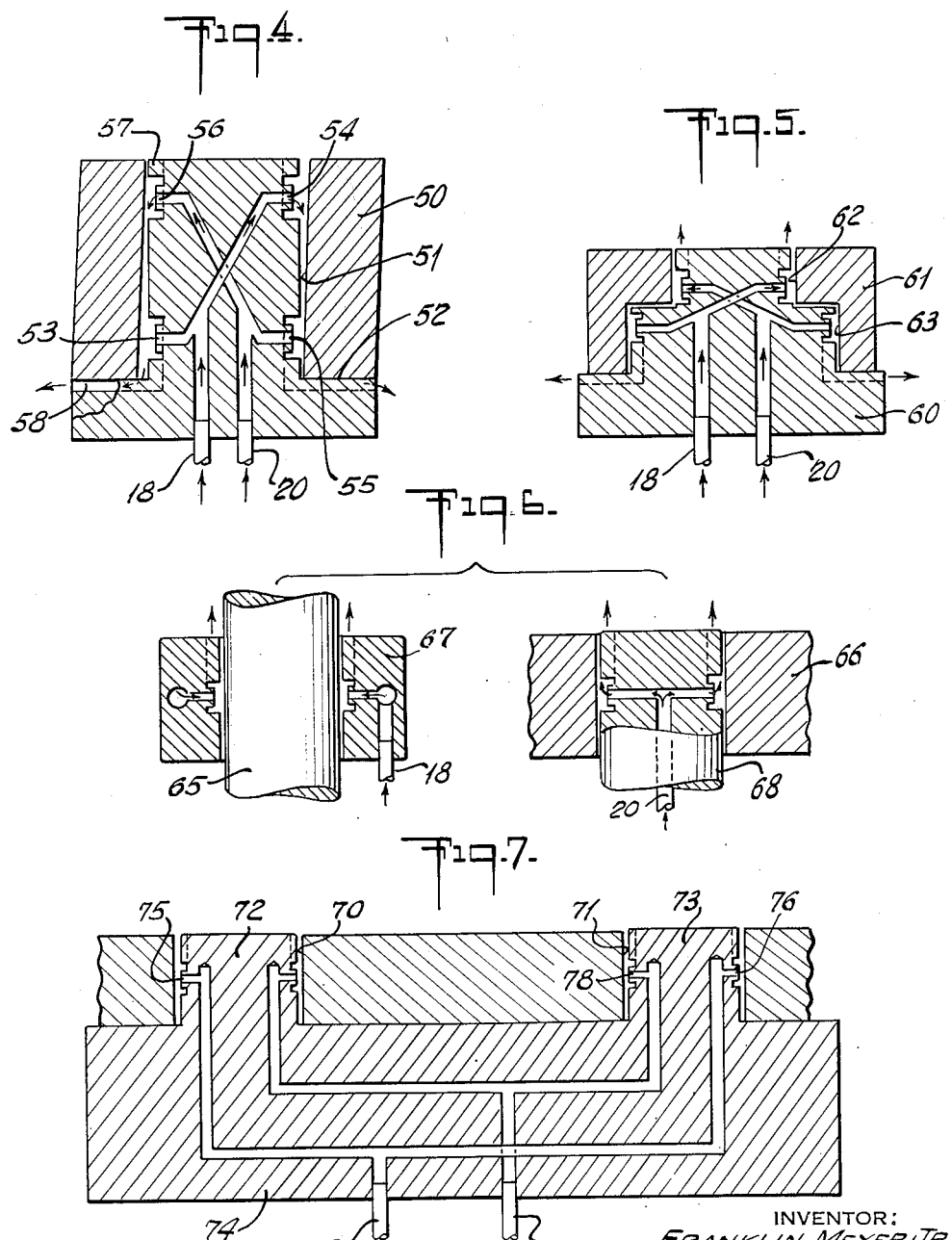

2,779,188

FLUID GAGE APPARATUS

Franklin Meyer, Jr., Forestdale, R. I., assignor to The Taft-Peirce Manufacturing Company, Woonsocket, R. I., a corporation of Rhode Island Application June 7, 1952, Serial No. 292,344

6 Claims. (Cl. 73—37.8)

The present invention relates to gaging apparatus of the general type employing the principle of fluid escape from an orifice into a space determined by the orifice and a juxtaposed surface of the article being checked. It is particularly concerned with a gaging apparatus which utilizes such principle or phenomena in a novel manner such as to produce an immediate direct reading or indication of the relation to each other of certain surfaces such as in the checking of articles for accuracy of taper, center distances, the squareness between the face and the bore, the concentricity of alignment of two parts and like conditions or articles where the matter of determining the relation between certain surfaces or portions of an article is the prime objective.

The problem of providing a satisfactory means for the purpose has been complicated by the fact that there are always involved variables other than the particular factor to be tested or determined. For example, the matter of absolute dimensions enters into the results. Accordingly it has normally in the past been necessary to employ at least two air circuits and a like number of indicators for determining independently the respective dimensions and then the operator by adding or subtracting the readings from the two or more indicators may compute the final desired answer. This computation has been required, for example, in checking tapered parts where the diameters may vary in addition to variations in the degree of taper. Similarly such computations would normally be necessary in checking center distances between holes and clearances between mating parts. Even in cases where it may not be necessary to obtain results from separate indicators and compute an answer as, for example, in checking the concentricity between diameters, nevertheless due to common permissible variations in diameter in such cases the position of the tolerance range on a normal scale will change, since the diameter will affect the final reading.

The apparatus of the present invention is adapted to provide a direct and accurate reading of the relation desired to be checked and to avoid the complications and likely human errors indicated to some extent above. The apparatus combines effectiveness and dependability with a marked simplicity of design and parts.

The principles and the construction and operation may be more readily understood and appreciated from a specific application thereof as illustrated herein. Accordingly the invention comprises the features of construction, combination of elements and arrangement of parts which will be exemplified in the particular apparatus hereinafter described and the scope of which invention will be indicated in the claims. Reference should be had to the following detailed description taken in connection with the accompanying drawing, in which:

Fig. 1 is a largely diagrammatic showing of the fluid circuits and the relation of the parts to each other and the application of the system to the gaging of an article;

Fig. 2 is a fragmentary view showing the front face of the indicator of Figure 1;

Fig. 3 is a view of the particular gaging nozzle shown in Figure 1 taken at 90° to the cross section of Figure 1 and adapted to show certain fluid escape passages; and Figs. 4, 5, 6 and 7 are more or less diagrammatic illustrations of the application of the system including the use of appropriate particular gaging nozzles, to the checking of different articles respectively.

The present apparatus employs certain features which may be similar to corresponding ones shown in the prior Patent No. 2,513,374 in which I am the patentee jointly with Clifford Stead. The system is shown herein in diagrammatic form for the most part since it is the principles and the combination and relation of the parts and fluid passages which are of particular importance rather than structural details. It will be understood accordingly that the system may be embodied in a compact device similar in external appearance and in many structural features to that disclosed in Figures 3 to 12 inclusive of the above patent. The complete system as shown in Figure 1 includes a source of supply of fluid under pressure such as that indicated by the conduit 10 which delivers the fluid such as compressed air to the regulator valve shown at 11 provided with a pressure adjustment knob 12. The device 11 may include a suitable filter means. From the regulator 11 the air is delivered into conduit 13 at the predetermined desired pressure in accordance with the setting of the regulator. The conduit 13 has two branch lines 14 and 15 in parallel, each delivering to an independent venturi means including the constrictions 16 and 17 respectively. From the constriction 16 the air flows through conduit 18 into a gage block 19, as shown in Figure 1, and from the constriction 17 the air flows through a conduit 20 into independent passages in the gage block 19. One of the lines 18 or 20 embodies at some point therein a bleed valve such as that shown at 21 inserted in the conduit 20.

The gage block 19 is designed to utilize the principle of fluid escape from an orifice and, as will be noted, the conduit 18 has branch lines within the block to orifices 23 and 24 located 180° apart; and conduit 20 has corresponding orifices 25 and 26. In the particular application of the invention in Figure 1, the gaging means is designed for testing the taper of an article or bushing shown generally at 27. The gage block 19 is, of course, of a particular size and taper for the purpose. The face of the boss 28 in which is located the orifice 23 is located slightly below the outer peripheral surface of the block 19 in accordance with the well known principle of nozzle type gages and the same is true as to the boss for each of the other nozzles. Suitable passages are provided for the free escape of the air end-wise of the gaging block such as those shown at 30 in Figure 3 for the orifice 23 and the passages 31 for the orifice 25. The amount of air escaping from the respective orifices and correspondingly the velocity in the respective conduits 18 and 20 is dependent, of course, upon the thickness of the spaces between the respective orifice opening and the juxtaposed inner surface of the bore of the part 27.

Returning to the Venturi means, it will be noted that a branch line 33 leads from the constriction 16 and a branch line 34 leads from the constriction 17. In accordance with the principle of such Venturi means the pressures in the pipes 33 and 34 will vary in accordance with the velocity of air in the respective conduits which in turn is dependent upon the amount of escape clearance for the orifices of the corresponding conduits. The respective conduits 33 and 34 are connected to opposing faces of a differential pressure diaphragm means in accordance with any suitable arrangement. The diaphragm means may be in the form of a bellows and accordingly in the present illustration the pipe 34 leads to the interior of an expansible bellows 35 and the pipe 33 leads to the interior of a closed casing 36 surrounding the bellows so that the pressure from pipe 33 is applied to the outer surface of the bellows 35. Accordingly the stem 37 connected to the surface of the bellows 35 moves longitudinally in accordance with the differential of the pressures applied to the bellows 35. This movement of the pin 37 is amplified and translated into movement of an indicator of a desired appropriate character. As shown somewhat diagrammatically herein the mechanism is similar to that shown in the aforesaid Patent No. 2,513,374 and includes a bar 38 rotatably mounted on center pivots at the ends thereof, the bar having a radial arm 39 to which the pin 37 is connected so that longitudinal movement of the pin rotates the shaft 38. The shaft 38 has secured thereto another radial finger 40 which is adapted to bear against an edge of segmental gear 41 pivoted on shaft 42. The segmental gear 41 has teeth meshing with the pinion 43 to rotate shaft 44 on which is mounted the pointer 45 operable over the dial 46, as shown particularly in Figure 2.

In the normal operation of the device, therefore, in testing the tapered bore of the bushing 27 the effect of the clearances at the orifices 23 and 24 will be applied through the Venturi 16 to the external surface of the bellows 36 and the effect of the clearances at the orifices 25 and 26 will be applied through the Venturi 17 to the interior of the bellows 35. These factors are applied as opposing pressure forces on the diaphragm means of the differential indicator and the resultant is directly indicated on the dial thereof and it becomes in effect a computing indicator. It will be understood from a consideration of the principles and operation of the device that the factor of the absolute diameters within the bore of the part being gaged does not affect the final result. In other words the effect of variation in diameter is applied to both sides of the differential measuring means and the gage reading is a direct measure of the accuracy of the taper. For example, if the total of the clearances at the orifices 23 and 24 equals the total of the clearances at the orifices 25 and 26, the forces will be equal and if the gage has been properly pre-set a zero reading will be obtained regardless of the exact values of those clearances. It should be borne in mind that the clearances as shown in the drawings are exaggerated for the sake of clarity.

Before starting the checking of articles the system will, of course, be appropriately adjusted. For this purpose a standard test part will be applied to the gaging nozzle 19 in place of the article 27 heretofore referred to and by manipulation of the bleed valve 21 the indicator adjusted to the zero position as shown in Figure 2. Also, the initial pressure may be adjusted through valve means 11 to vary the sensitivity. The dial may have thereon adjustable pointers 47 positioned to indicate the tolerance limits in the subsequent testing of the taper of successive articles 27.

The system illustrated in Figure 1 is readily applicable to the checking of various articles to determine the relation of surfaces or parts of which Figures 4, 5 and 6 show additional typical examples. In Figure 4 it is utilized to test the cylinder 50 for squareness between the bore 51 and the end face 52. In this gaging nozzle the air conduits 18 and 20 are connected to a staggered orifice arrangement. Conduit 18, for example, is connected to orifices 53 and 54, and conduit 20 to orifices 55 and 56. The gage block embodies suitable passages for the free escape of the air after flowing away from the boss surrounding the respective orifice as explained in connection with the gage block of Figures 1 and 3. For example, the air from orifice 56 may escape through longitudinally extending channels 57, and air from orifice 53 may escape through channel 58. The example of Figure 4 illustrates a cylinder in which the bore is assumed to be non-perpendicular to the face 52 such that, in the rotated position of the cylinder shown, the total of the clearances at the ends of orifices 55 and 56 is less than the total of the clearances at the ends of orifices 53 and 54. In the drawings all clearances are of course shown in greatly exaggerated form in the interest of clarity. The difference in clearances just referred to will produce a certain differential of pressure and be registered correspondingly on the dial. Rotation of the work piece 50 will of course produce a variation in the reading on the dial as the clearances at the respective orifices change. It is noted that here again the effect of the diameter in absolute terms is eliminated from the gaging results and the gage comprises in effect a computing indicator and gives a direct reading of the relative squareness of the bore to the end face. If one or more conventional single circuit indicators were employed each indicator reading would include as a factor the absolute diametral dimension at that point.

In Figure 5 the system is applied, with the use of an appropriate gage block 60, to the checking of concentricity between two internal cylindrical portions of an article 61 having an internal bore of stepped diameter defined by the surfaces 62 and 63. If an eccentricity exists such that for example in the rotary position selected the sum of the clearances of the two staggered orifices connected to conduit 18 is greater as illustrated than that of the two staggered orifices connected to the conduit 20, the differential effect will be registered on the indicator and the reading will be a measure of the eccentricity which will be independent of the diametral dimensions.

An application of the system to the checking of the fit or clearances between the corresponding dimensions of mating parts is illustrated in Figure 6. In this figure the diameter of a cylinder 65 and the bore of a mating part 66 are being checked for clearance. One of the parts 65 or 66 should be of known standard size, and the system then indicates whether the other part being tested has an appropriate mating size. Conduit 18, for example, is connected in gage ring 67 to opposed orifices therein, and conduit 20 is connected in gage plug 68 to oppose orifices therein. The air velocity in conduit 18, therefore, is a measure of the diameter of the cylindrical part 65, and the velocity in conduit 20 is a measure of the diameter of the bore in part 66. These two factors, however, are applied differentially to the computing indicator and the reading is a direct measure of the relation of the respective diameters. It may be noted in this regard that any eccentricity between the cylindrical part 65 and its gage 67, or between the bore in part 66 and its gage plug 68 is of substantially no effect since the total of the clearances at the particular pair of orifices remains the same.

In Figure 7 the system is applied to the checking of the center distance between a pair of openings 70 and 71 into which extend the plug portions 72 and 73 respectively of the gage block 74. If the sum of the clearances at orifices 75 and 76 connected to conduit 18 is different from the sum of the clearances at the orifices 77 and 78 it will register on the indicator and the displacement from zero reading will comprise a direct reading of the departure of the center distances of the openings 70 and 71 from the prescribed standard.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim:

1. In a fluid gage apparatus, in combination, a source of fluid under predetermined pressure, a pair of conduits connected thereto, a gaging means including a gaging nozzle mounted in a gaging body connected to each of said conduits, a Venturi means in each of said conduits, and an indicator provided with a fluid connection into each of said Venturi means and arranged to respond to the differential pressures thereof in accordance with the respective fluid velocities.

2. In a fluid gage apparatus, in combination, a pair of conduits adapted to conduct fluid in parallel, means for supplying fluid under predetermined pressure to each of said conduits, a gaging means including a gaging nozzle mounted in a gaging body connected to each of said conduits adapted to be applied to articles to be gaged, a Venturi means in each of said conduits, an indicator provided with a fluid connection into each of said Venturi means and arranged to respond to the differential pressures thereof in accordance with the fluid velocities in the respective conduits, and a fluid bleed valve in one of said conduits between its gaging nozzle means and Venturi means to vary the fluid flow in said conduit and the setting of said indicator.

3. In a gaging apparatus adapted to employ the principle of variations in fluid escape from an orifice into a space between the surface of an article being tested and the orifice, the combination of a first fluid conduit, a first gaging means including a gaging nozzle mounted in a gaging body connected thereto adapted to be applied to the testing of the space provided between the orifice and a certain surface of an article, a second fluid conduit in parallel with the first, a second gaging means including a gaging nozzle mounted in a gaging body connected to said second conduit adapted to be applied to the testing of the space provided between the orifice thereof and another surface of an article related to the first mentioned surface, means for supplying fluid under predetermined pressure to each of said conduits, a Venturi means in each of said conduits, an indicator provided with a fluid connection into each of said Venturi means and arranged to respond to the differential pressures thereof in accordance with the fluid velocities in the respective conduits and thereby to indicate the relation of the spaces being tested and accordingly of the relation of said surfaces.

4. In a fluid gage apparatus, in combination, a pair of fluid conduits, a first gaging means including a gaging body having an air escape means therein connected to a first one of said conduits, a second gaging means including a gaging body having an air escape means therein connected to the other of said conduits, the respective gaging means being arranged for the testing of different dimensions, means for supplying fluid under predetermined pressure to each of said conduits, intermediate means in each of said conduits including a branch line for producing in said line a fluid pressure variable in accordance with the fluid flow in the respective conduit, an indicator including a diaphragm means, said branch lines being connected to said diaphragm means in a manner to direct the pressures thereto in an opposed relation whereby said indicator is responsive to the differential effect thereof and thereby of the variations of the different dimensions, and an adjustable bleed valve in one of said conduits between said gaging nozzle means and said intermediate means thereof to vary the effect on said indicator and adjust the setting thereof.

5. In a gaging apparatus employing the principle of fluid escape from a gap, the combination of, a first fluid conduit, a first gaging means including a gaging body having an air escape means mounted therein connected to said first conduit adapted to be applied to the measurement of a certain transverse dimension of an article, a second fluid conduit in parallel with the first, a second gaging means including a gaging body having an air escape means connected to said second conduit adapted to be applied to the measurement of a different transverse dimension of an article related to the first mentioned dimension, means for supplying fluid under predetermined pressure to each of said conduits, means in each of said conduits including a branch line for producing in said branch line a fluid pressure variable in accordance with the fluid flow in the respective conduits as determined by the air escape at the respective air escape means, and a single indicator including a fluid pressure responsive means and a movable indicator element connected thereto, said pressure responsive means being so constructed and said branch lines being connected thereto in a manner whereby variations in the two measurements and thereby of the respective escape gaps for the two conduits produce opposite effects on the pressure responsive means and the indicator registers the differential effect thereof.

6. In a gaging apparatus adapted to employ the principle of variations in fluid escape at an escape gap, the combination of a first fluid conduit, a first gaging means including a gaging body having an air escape means therein connected to said first conduit adapted to be applied to the measurement of a certain transverse dimension of an article, a second fluid conduit in parallel with the first, a second gaging means including a gaging body having an air escape means therein connected to said second conduit adapted to be applied to the measurement of another transverse dimension of an article related to said certain first dimension, means for supplying fluid under predetermined pressure to each of said conduits, a single indicator including a flexible diaphragm means and a movable element connected thereto, said indicator being provided with a fluid connection into each of said conduits, the pressure in the respective connections varying in accordance with the fluid flow in the corresponding conduit as determined by the escape at the corresponding air escape means and said fluid connections being arranged to direct the pressures therein to said diaphragm means in opposed relation whereby the indicator is responsive to the differential effect of the variable pressures in said connections and the indicator registers directly the relation of the two dimensions.

References Cited in the file of this patent

UNITED STATES PATENTS

| | | |
|---|---|---|
| 1,162,475 | Gibson | Nov. 30, 1915 |
| 1,803,260 | Kondo | Apr. 28, 1931 |
| 2,513,374 | Stead et al. | July 4, 1950 |
| 2,573,843 | Hendrix et al. | Nov. 6, 1951 |
| 2,594,046 | Mahlmeister | Apr. 22, 1952 |
| 2,594,077 | Schulze | Apr. 22, 1952 |
| 2,665,579 | Fortier | Jan. 12, 1954 |